United States Patent [19]

Tatsuno et al.

[11] Patent Number: 4,513,300

[45] Date of Patent: Apr. 23, 1985

[54] APPARATUS FOR DRIVING A SEMICONDUCTOR LASER FOR USE IN A LASER-BEAM PRINTER

[75] Inventors: Kimio Tatsuno, Kokubunji; Susumu Saito, Hachioji; Shoichi Ito, Ibaraki; Isamu Terashima, Hitachi; Yoshifumi Homma; Mitsugu Asano, both of Ibaraki; Yoshifumi Ono, Katsuta, all of Japan

[73] Assignees: Hitachi, Ltd.; Hitachi Koki Co., Ltd., both of Tokyo, Japan

[21] Appl. No.: 504,380

[22] Filed: Jun. 14, 1983

[30] Foreign Application Priority Data

Jun. 18, 1982 [JP] Japan ............................... 57-103761

[51] Int. Cl.³ ............................................ G01D 15/14
[52] U.S. Cl. .................................... 346/160; 358/300
[58] Field of Search ....................... 346/154, 160, 108; 358/300

[56] References Cited

U.S. PATENT DOCUMENTS 4,408,871 10/1983 Kojima .......................... 358/300 X Primary Examiner—Thomas H. Tarcza
Attorney, Agent, or Firm—Antonelli, Terry & Wands

[57] ABSTRACT

An apparatus for driving a semiconductor laser for use in a laser-beam printer, in which a laser beam from the laser is deflected so as to scan a light-sensitive drum and a light-sensitive detector placed in the vicinity of one edge of the drum, comprises a first device for determining the operation level for the laser when it scans the drum to record information thereon, a second device for determining the operation level for the laser when it scans the detector to provide a scanning start pulse signal and a controller for controlling the first and second devices so that they are alternately enabled to determine the intensity of the laser beam depending upon whether the drum or the detector is scanned, whereby the intensity of the laser beam is allowed to be adjusted in accordance with the varying light-sensitivity of the drum without fluctuating the instant of generation of the scanning start pulse signal.

3 Claims, 7 Drawing Figures

APPARATUS FOR DRIVING A SEMICONDUCTOR LASER FOR USE IN A LASER-BEAM PRINTER

BACKGROUND OF THE INVENTION

The present invention relates to an apparatus for driving a semiconductor laser which is used as a light source in a laser-beam printer, more particularly to a laser driving apparatus for ensuring stable periodic scanning operations.

In an example of a laser beam printer, when a laser beam emitted from a semiconductor laser scans a light-sensitive drum to record information thereon, it also scans a light-sensitive detector provided at one edge of the drum to obtain a scanning start pulse signal which defines a reference time point for the start of each scanning of the drum. Such a laser-beam printer is disclosed in, for example, a Japanese Patent Application laid-open No. 2826/1975 laid open on Jan. 13, 1975.

As is well known, the light-sensitivity of a light-sensitive drum used in a laser-beam printer degrades with time, that is, the light-sensitivity of the drum decreases as the drum is used longer. In order to maintain the print quality constant, it is required to increase the output or the intensity of the laser beam in accordance with the decreasing light-sensitivity of the drum. When the light-sensitivity of the drum becomes lower than a certain level, it is impossible to obtain a desired print quality, and therefore the drum is replaced by a new drum. With the new drum the output or the intensity of the laser beam has to be lowered to obtain the same print quality, since the new drum is considerably high in the light-sensitivity as compared with the deteriorated one. As mentioned above, the intensity of the laser beam incident upon the detector is changed in accordance with the light-sensitivity of a drum, and therefore the output of the detector is also changed. Such change in the output of the detector fluctuates the time at which the scanning start pulse signal is generated, thereby fluctuating the starting time point for each scanning operation for the drum.

Further, when the drum has a relatively high light-sensitivity and the intensity of the laser beam is too lowered, the output of the detector becomes so small that it is required to increase the gain of an amplifier for amplifying the output of the detector. Such an increase in the gain of the amplifier inevitably degrades the frequency-characteristic of the amplifier, thereby varying the time at which the scanning start pulse signal is generated.

Further, in the case where the light-sensitivity of a drum in use is not identical due to use of a different drum for respective cases, it is required to change the output or the intensity of the laser beam and adjust a threshold level for determining the time at which the scanning start signal is generated.

SUMMARY OF THE INVENTION

It is an object of the prevent invention to provide an apparatus for driving a semiconductor laser which can suppress the above-mentioned drawbacks of the prior art, generates a stable scanning start-pulse signal, and can control the output or the intensity of a laser beam from the semiconductor laser in accordance with the light-sensitivity of a light-sensitive drum.

In order to attain the above object, according to the present invention, there is provided a laser driving apparatus in which one scanning period during which a light-sensitive drum and a light-sensitive detector are scanned by a laser beam in a lateral direction of the drum, is divided into a time period for scanning the drum and the remaining time period in which the detector is scanned, and a laser output level at the drum scanning time period and that at the remaining time period are controlled separately.

DESCRIPTION OF THE PREFERRED EMBODIMENTS

For a better understanding of the present invention, a conventional laser beam printer will first be explained with reference to FIGS. 1 and 2.

Figure 1:
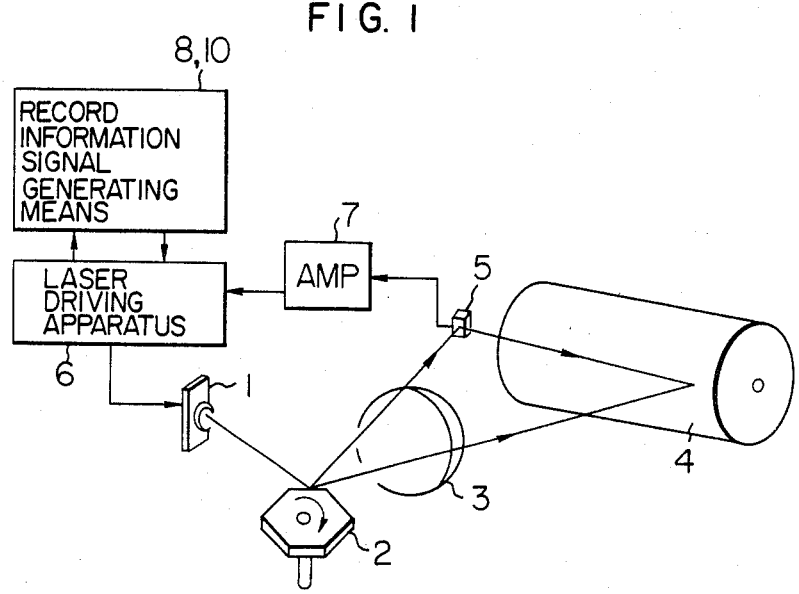
FIG. 1 is a schematic diagram showing an outline of a laser-beam printer in which a semiconductor laser is used as a light source.

Referring to FIG. 1, a laser beam from a light source 1 formed of a semiconductor laser is focussed by a focussing lens 3 on a light-sensitive drum 4 and is deflected by a deflector 2 so that a light spot performs a scanning operation in a direction parallel to the lateral direction of the drum 4. A light-sensitive detector 5 for detecting the start of the scanning is disposed on the scanning line in the vicinity of one edge of the drum 4. Each time the detector 5 is scanned by the laser beam, the detector 5 generates a scanning start pulse signal defining a reference time point for the start of a scanning in the lateral direction of the substantial part of the drum and a reference time point for the start or beginning of supply of a modulated signal to be recorded on the drum to a laser driving apparatus 6 from recording information signal generating means 8 and 10. When the scanning start pulse signal is not used, changes in the scanning operation of the deflector 2 are accumulated for a long time, and thus a recording operation cannot start from a correct position on the drum. As can be seen from the above, the light-sensitive detector 5 is indispensable for the periodic scanning operations. Incidentally, reference numeral 7 in FIG. 1 designates an amplifier for amplifying a light detection output signal from the detector 5. The light detection output signal has such a waveform as shown in FIG. 2, and a threshold level $V_o$ is set for the light detection output signal to generate the scanning start pulse signal on the basis of the level $V_o$. In other words, the above-mentioned reference time point is determined by the intersection of the rising portion of the light detection output signal and the threshold level $V_o$.

In the case where the light-sensitivity of the drum decreases owing to the aging (or fatigue) thereof, or the drum is replaced by a new drum, the intensity of the laser beam is varid or objected in order to maintain the same print quality. Then, a time point $T_o$ corresponding to the above-mentioned intersection is shifted to a time point $T_1$ or $T_2$ as shown in FIG. 2. Accordingly, in order to keep constant the time point to corresponding to the intersection, the threshold level $V_o$ has to be adjusted, which causes great inconvenience.

Further, in the case where a new drum of a relatively high light-sensitivity is used in place of a long used drum and the output level of the laser is considerably lowered to maintain the same print quality as before, the intensity of the laser beam incident upon the detector 5 is insufficient to obtain a desired light detection output signal, and therefore the gain of the amplifier 7 has to be increased, which inevitably degrades the frequency-characteristic of the amplifier 7. Thus, the time at which the scanning start pulse signal is generated (that is, the time $T_o$) is fluctuated.

Next, the fundamental technical thought of the present invention will be explained below, with reference to FIGS. 3A and 3B. Referring to FIGS. 3A and 3B, the intensity of the laser beam is kept constant for a period during which the detector is scanned by the laser beam (that is, a period $T_o$), and is set to a value $P_o$ which is readily available in consideration of the light-sensitivity and frequency characteristic of the detector in use and the gain and frequency characteristic of the amplifier in use. In other words, a proper laser output $P_o$ is selected with the gain of the amplifier 7 being adjusted so that the time at which the scanning start pulse signal is generated, that is, the time $T_o$ shown in FIG. 2 is kept invariable or fixed with the light sensitivity of the detector 5 taken into consideration. Further, the laser output is set to a value $P_1$ or $P_2$ for a period during which the light-sensitive drum is scanned by the laser beam (that is, a period $T_1$). The laser output $P_1$ or $P_2$ is determined in accordance with the light-sensitivity of the drum. Incidentally, FIG. 3A shows the case where the laser output $P_o$ during the detector scanning period is made larger than the laser output $P_1$ during the drum scanning period because of the use of a drum of a relatively high light-sensitivity, and FIG. 3B the case where the laser output $P_o$ during the detector scanning period is made smaller than the laser output $P_2$ during the drum scanning period because of the use of a drum of a relatively low light-sensitivity.

Figure 4:
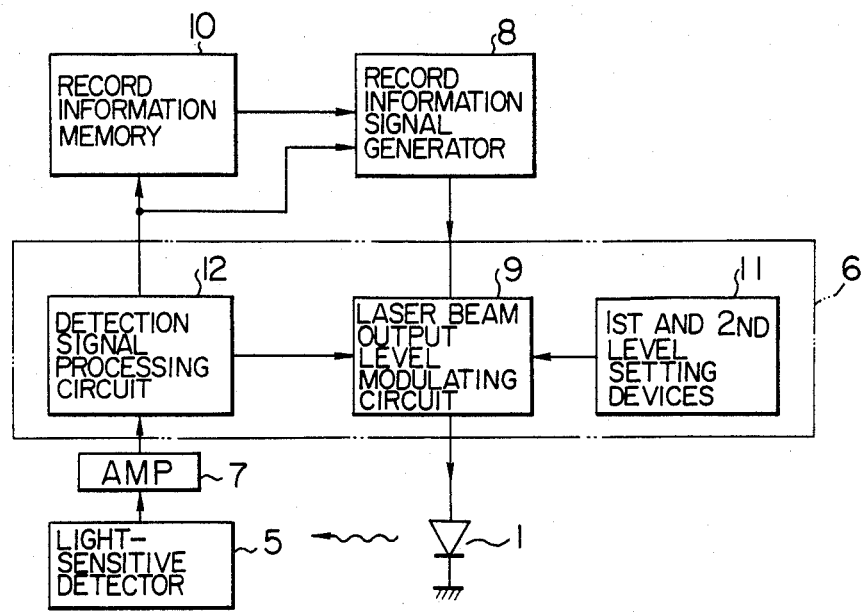
FIG. 4 is a block diagram showing an embodiment of the present invention.

FIG. 4 is a block diagram showing an embodiment of an apparatus for driving a semiconductor laser in the above-mentioned manner.

Referring to FIG. 4, a semiconductor laser 1 is driven by a laser driving apparatus 6, which includes a detection signal processing circuit 12, a laser beam intensity level modulating circuit 9, and first and second level setting devices 11. The detection signal processing circuit 12 receives an amplified detection output signal from an amplifier 7, and supplies a first modulation control signal to a record information memory 10 and a record information signal generator 8 and supplies a second modulation control signal to the laser beam output level modulating circuit 9, on the basis of a scanning start pulse signal generated as explained above with reference to FIG. 2. The first modulation control signal determines the beginning and length of a time period during which an information signal to be recorded is sent out (or outputted), and the second modulation control signal determines a timing with which first and second D.C. operating levels set by the first and second level setting devices 11 are changed over to be alternately effective. The record information signal generator 8 may be formed of a modulator arranged to receive a modulating signal from the record information memory 10 and to start its modulation operation upon receipt of the scanning start signal generated in the detection signal processing circuit 12. The laser beam output level modulating circuit 9 serves to establish a D.C. operating level for the laser by an alternate use of the first and second levels set by the first and second level setting devices 11 in response to one of the modulation control signals from the detection signal processing circuit 12, and further serves to modulate the intensity of the laser beam in response to the output of the record information signal generator 8. The first level is the D.C. output level of the laser when the laser beam scans the drum 4 shown in FIG. 1 to record on the drum the record information signal from the generator 8, and the second level is the D.C. output level of the laser when the laser beam scans a light-sensitive detector 5 to obtain a detection output signal from the detector 5. The first and second levels can be set independently of each other.

In such a laser driving apparatus, even when the light-sensitivity of the drum varies, the print quality can be kept constant only by adjusting the first level setting device, and adjustments related to the detector 5, that is, the adjustments of the threshold level, the gain of the amplifier 7 and the second level setting device are no longer required.

Figure 5:
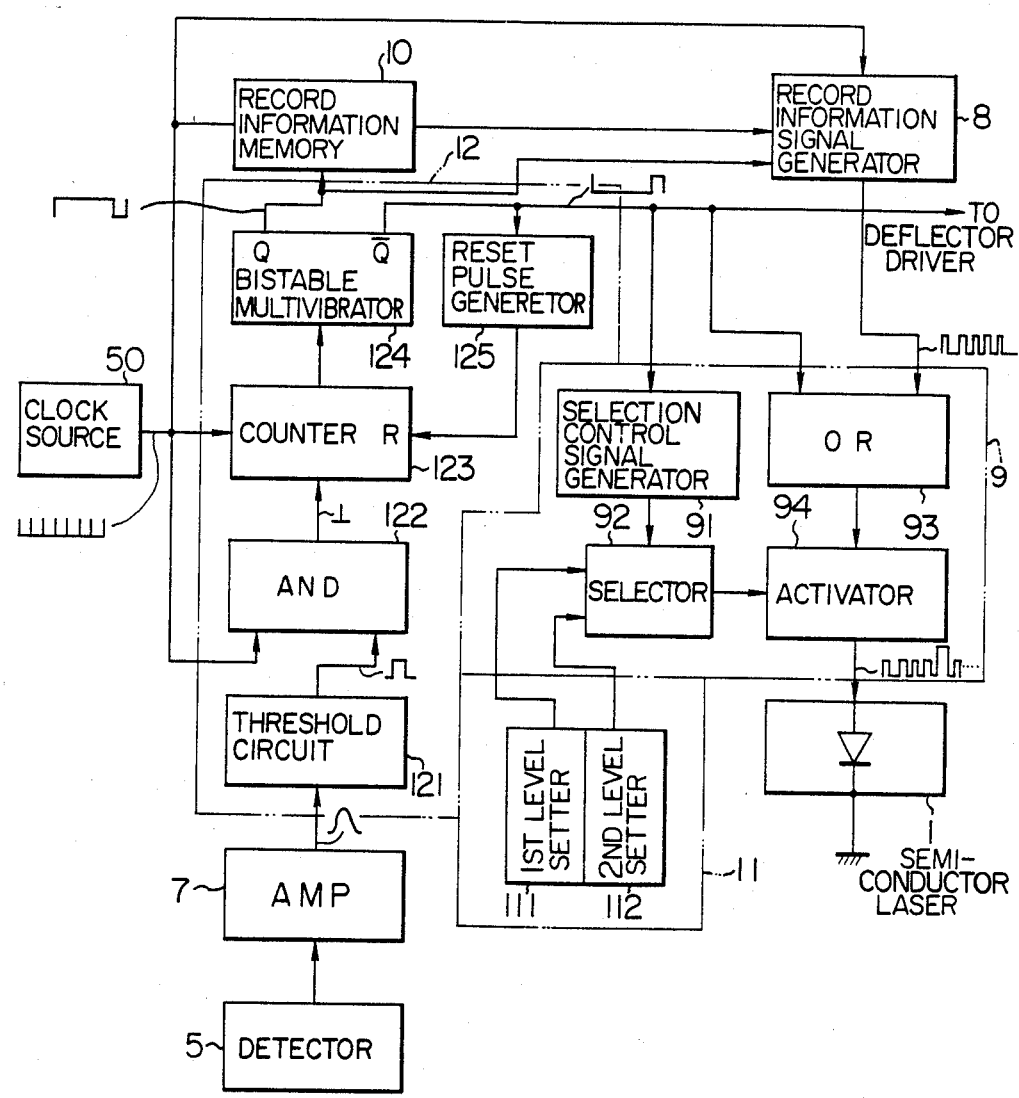
FIG. 5 is a block diagram showing the embodiment of FIG. 4 in more detail.

The above-mentioned embodiment will be explained below in more detail, with reference to FIGS. 5 and 6. In FIGS. 4 and 5, like reference numerals designates like parts.

Figure 6:
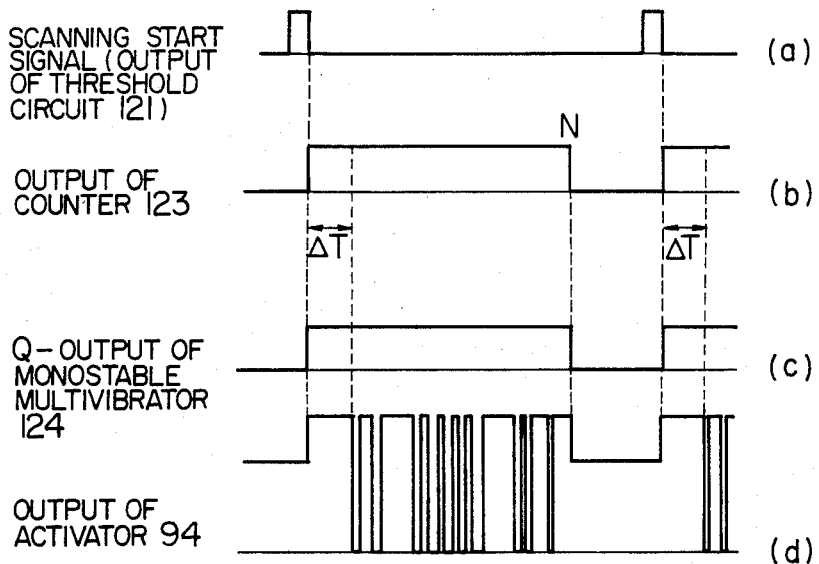
FIG. 6 is a waveform chart showing signals which are observed in several parts of the embodiment shown in FIG. 5.

Referring to FIGS. 5 and 6, the detection signal processing circuit 12 includes a threshold circuit 121 supplied with the output of the amplifier 7 for generating a detection pulse signal (shown at (a) of FIG. 6) on the basis of a threshold level, an AND circuit 122 having a first input terminal fed with clock pulses from a clock source 50 and a second input terminal supplied with the detection pulse signal, a counter 123 beginning to count the clock pulses from the clock source 50 immediately upon receiving the output of the AND circuit 122 and generating a count-completion signal when a predetermined number of clock pulses have been counted, a bistable multivibrator 124 supplied with the output of the counter 123 for generating at Q and $\overline{Q}$ output terminals first and second modulation control signals which are 180° out of phase with each other, and a reset pulse generator 125 fed with the second modulation control signal from the $\overline{Q}$ output terminal of the bistable multivibrator 124 for generating a reset pulse to be applied to the counter 123. The predetermined number of clock pulses with which one counting operation of the counter 123 is completed is such that the time period for one counting operation is equal to the sum of the time period $\Delta T$ for the laser beam to laterally scan the portion from the point corresponding to the appearance of a scanning start pulse to the record-start edge of the substantial part of the drum 4 and the time period for the laser beam to laterally scan the portion from the record-start edge to the record-end edge of (the substantial part of) the drum 4. Thus, the counter 123 is operative in response to such a clock pulse from the clock source 50 as being coincident with the fall of the detection output signal from the threshold circuit 121. The clock pulses from the clock source 50 are also supplied to the record information memory 10 and record information signal generator 8. The memory 10 and the generator 8 are, in this example, arranged so as to deliver signals carrying information to be recorded ΔT after the instant of reception of the first modulation control signal from the Q output terminal of the multivibrator 124.

First and second level setters 111 and 112 are used for setting the first and second levels, respectively.

The laser beam output level modulating circuit 9 includes a selector 92 arranged to receive the outputs of the first and second level setters 111 and 112, a selection control signal generator 91 responsive to the second modulation control signal from the Q output terminal of the monostable multivibrator 124 for generating a selection control signal to be applied to the selector 92, an OR circuit 93 having a first input terminal for reception of the output of the record information signal generator 8 enabled by the first modulation control signal and a second input terminal for reception of the second modulation control signal from the monostable multivibrator 124, and an activator 94 supplied with the output of the OR circuit 93 for driving the laser 1 at a D.C. driving level which is obtained by alternately selecting the first and second levels by the selector 92.

Now, the operation of the embodiment shown in FIG. 5 will be explained.

Figure 2:
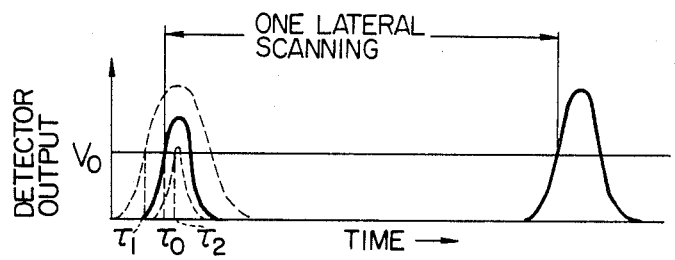
FIG. 2 is a waveform chart showing the output of the light-sensitive detector shown in FIG. 1.
Figure 3A:
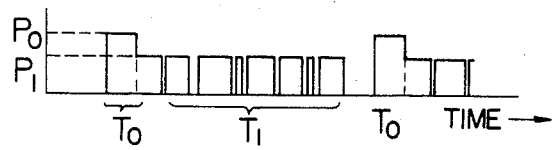
FIGS. 3A and 3B show waveforms of laser driving signals useful to explain the fundamental technical thought of the present invention.
Figure 3B:
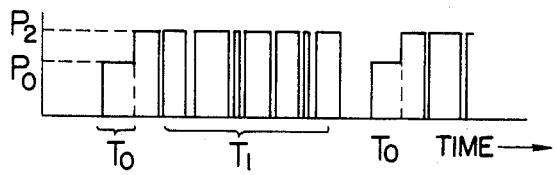

At first, a light detection signal such as shown in FIG. 2 is derived from the detector 5, and is wave-shaped by the threshold circuit 121 to obtain a pulse signal such as shown at (a) of FIG. 6. The logical product of the pulse signal thus obtained and such a clock pulse from the clock source 50 as being coincident with the fall of the detection signal of the pulse waveform is obtained by the AND circuit 122 to form a scanning start pulse signal, which sets the counter 123 and operates the laser 1 at a high D.C. level. Namely, at this time, the Q output of the multivibrator 124 assumes a high level. Accordingly, the record information from the memory 10 is supplied to the record information signal generator 8 and the record information signal from the generator 8 is supplied to the laser 1 through the OR circuit 93 and activator 94, to subject the laser output to pulse modulation (as shown at (d) of FIG. 6). When a predetermined number of (N) clock pulses have been counted by the counter 123, the Q output of the multivibrator 124 then assumes a low level (shown at (c) of FIG. 6). After this time, the laser is operated at a lower D.C. level (as shown at (d) of FIG. 6), to obtain the next light detection signal.

The predetermined number N of clock pulses is selected so as to equal to the sum of the above-mentioned ΔT and a time period necessary to record a character signal (namely, the record information signal) on one scanning line of the drum.

Thus, the activator 94 is operated at a D.C. operating level corresponding to the light-sensitivity of the drum (that is, the higher D.C. operating level in this example) when the Q output of the multivibrator 124 assumes the high level, and is operated at another D.C. operating level corresponding to the light-sensitivity of the detector (that is, the lower D.C. operating level in this example) when the above-mentioned Q output assumes the low level.

The D.C. operating level of the semiconductor laser 1 assumes two values, one for the detector and the other for the drum. These values are set by the level setters 111 and 112, separately or independently.

As has been explained in the foregoing, according to the present invention, a light-sensitive detector portion and a light-sensitive drum portion can be adjusted independently of each other, and thus a stable scanning start pulse signal can be obtained even in the case where a plurality of drums different in the light-sensitivity from each other are used, or the light-sensitivity of a drum degrades with time due to the fatigue thereof.

Further, the laser output level for the detector can be readily made different from that for the drum by controlling a current for driving the semiconductor laser. Therefore, the present invention is particularly effective in the case where a semiconductor laser is preferably used as the light source of a laser beam printer.

We claim:

1. An apparatus for driving a semiconductor laser for use in a laser-beam printer including a light-sensitive drum, a deflector for deflecting a laser beam from the semiconductor laser, a light-sensitive detector placed in the vicinity of one of the edges of the drum for generating a scanning start signal, deflection of the laser beam by the deflector being such that the drum and the detector are scanned by the deflected beam, and means for producing a record-information signal, the apparatus comprising:

first means responsive to the output of said record information signal generating means for modulating the intensity of a laser beam from said semiconductor laser for generation of a modulated laser beam;

second means for generating first and second intensity modulation control signals in synchronism with said scanning, said first modulation control signal being in a pulse-waveform having a period identical with one scanning period in the direction lateral of said drum and a duration time beginning in synchronism with said scanning start signal and continuing at least for a time period necessary for said laser beam to laterally scan the substantial part of said drum, and said second modulation control signal being in a pulse-waveform obtained by inverting the waveform of said first modulation control signal, said drum and said detector being scanned during the said time period and the remaining time period in said one scanning period, respectively; and third means for determining first and second levels for the intensity of said laser beam during the drum scanning time period and the remaining time period in said one scanning period, respectively, said first means being further responsive to one of said first and second modulation control signals to establish a D.C. operating level for said laser, said D.C. operating level being alternately representative of said first and second levels depending upon the level of said one modulation control signal of the pulse waveform.

2. An apparatus according to claim 1, in which said second means includes a counter for counting clock pulses from a clock source for a time period identical with said duration time of said first modulation control signal of said pulse-waveform and producing a count-completion signal at a completion of the counting and a multivibrator responsive to said count-completion signal from said counter to generate said first and second modulation control signals, and said third means includes first and second level setting devices for setting said first and second levels.

3. An apparatus according to claim 2, in which said first means includes an activator for connection with said laser, a logical sum circuit having a first input terminal connected for reception of the output from said record-information signal producing means, a second input terminal connected for reception of said second modulation control signal from said multivibrator and an output terminal connected with said activator for activation of said laser, said record-information signal producing means being enabled by said first modulation control signal and a selector interconnected between said first and second level setting devices and said activator and being responsive to one of said first and second modulation control signals to establish said D.C. operating level.

* * * * *